Nov. 19, 1935.  R. J. GITS  2,021,414
OIL SEAL
Filed Sept. 11, 1933
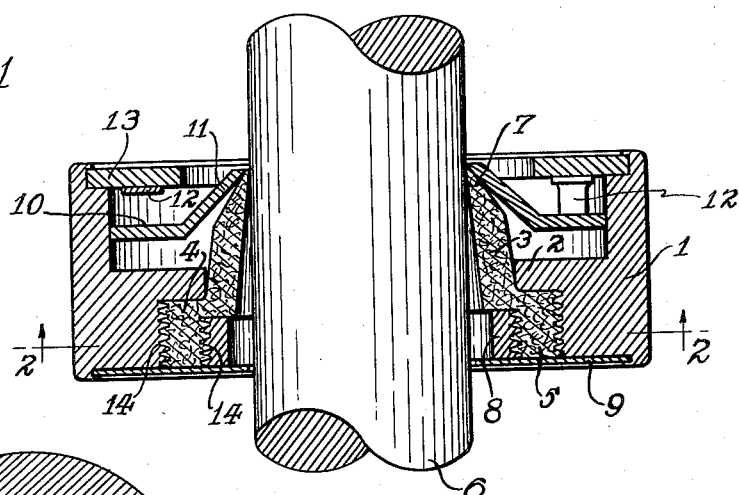
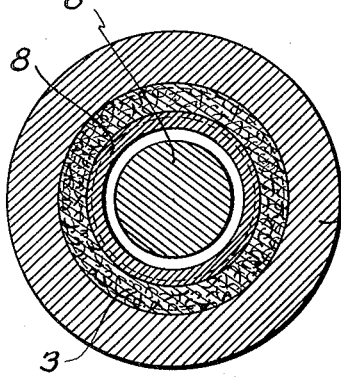
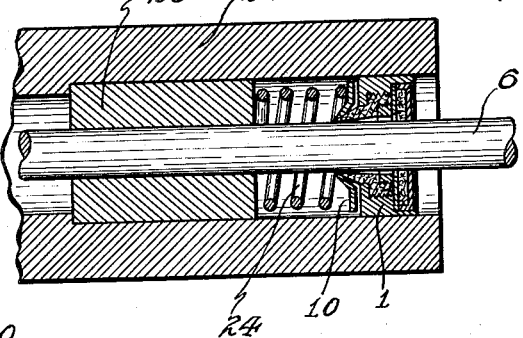
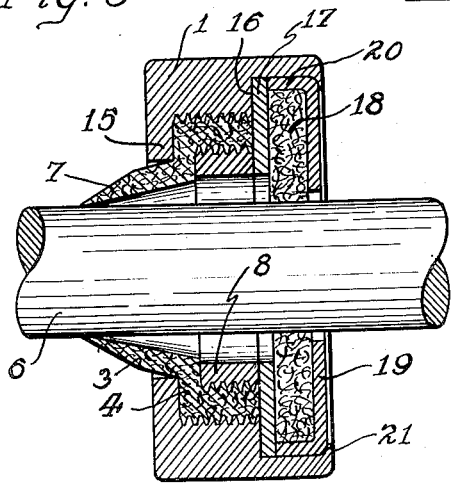
Witness:
Adolph T. Berg
Inventor
Remi J. Gits
by Kummler, Kummler & Woodworth
his Attys.

Patented Nov. 19, 1935

2,021,414

UNITED STATES PATENT OFFICE 2,021,414

OIL SEAL

Remi J. Gits, Chicago, Ill.

Application September 11, 1933, Serial No. 688,932

1 Claim. (Cl. 288—1)

This invention relates to oil seals for rotating or reciprocating shafts and rods and particularly to seals of the cage type, adapted to be positioned within a tubular housing through which the shaft or rod extends.

The main objects of my invention are to provide an improved seal in which an annular axially extending packing is securely clamped to the side wall of the housing in a manner that prevents inward squeezing of the body portion of the packing and permits substantially the end portion only thereof to contact the shaft; to provide an improved means for securing an annular packing to its enclosing shell; to provide an improved seal for reciprocating rods and shafts in which an inwardly converging axially extending annular packing is secured so as to positively prevent the same from becoming inverted by the motion of the rod or shaft; and to provide an improved cage type seal structure that is cheaper to manufacture.

A specific embodiment of this invention is shown in the accompanying drawing in which:

Fig. 1 is a cross sectional view of an oil seal embodying my invention.

Fig. 2 is a sectional view of the same taken on line 2—2 of Fig. 1.

Fig. 3 is a sectional view of a modified form of my improved seal.

Fig. 4 is a sectional view showing an application of the seal shown in Fig. 3.

In the form shown in the drawing the improved seal comprises a hollow shell or housing arranged to surround a rotating or reciprocating rod or shaft and provided with an annular packing member, telescopically inserted, which has an axially extending portion arranged to embrace the shaft with its end margin and a flange-like portion arranged to extend along and contact the inner side wall of the shell or housing. The packing member is secured by means of a metal ring positioned in the flange portion thereof and expanded radially to clamp the same against the side wall of the shell or housing; and a spring actuated contacting member is provided at the shaft embracing portion of the packing to urge the marginal edge thereof into engagement with the shaft.

In one form all of these elements are assembled within the shell or housing and secured so as to provide a single cage type unit adapted to be driven into or otherwise held within a shaft housing. In another form the spring actuated contracting member is omitted from the unit structure and is employed as a separate element.

It has long been the practice to provide self-contained oil seals for insertion as an assembled unit within a cylindrical housing and these seals are usually made up in a form similar to that shown in the accompanying drawing. In these seals, however, the packing member is formed with an annular radial flange at one end which is positioned against the inwardly flanged bottom of a cup-shaped shell or housing and is secured by means of an annular clamping ring which is held under an axially directed pressure against the packing member flange so as to clamp the same against the bottom of the shell.

This arrangement is unsatisfactory because the pressure against the radial flange of the packing tends to force the packing inwardly toward the shaft when the packing becomes soft from usage and being soaked with oil, and as a result there is an objectionable long contact between the packing and the shaft along which oil can creep or be worked. Also when there is an extended contact between the packing and the shaft there is much greater wear on both the shaft and the packing and the effective life of the seal is diminished.

It is because of this latter objection that certain seals such as those shown in my Patent No. 1,925,729 are arranged so that there is only a line contact between the edge of the packing member and the shaft. However, it is found that even such an improvement is often defeated because of the manner in which the packing is secured to the shell or housing and it was in view of this problem as well as others that the herein disclosed improved seal was devised.

In the form shown in Fig. 1 of the drawing the improved seal comprises a hollow annular shell or housing 1, having a counterbore in each end such that an annular shoulder or flange 2 is formed on the inner side intermediate the ends. An annular packing member 3, formed to provide an annular shoulder 4 having an axially extending flange or collar 5 thereon, is positioned in one of the counterbores of the shell 1 so that the shoulder 4 of the packing abuts the shoulder 2 of the shell, the flange 5 being formed with an outside diameter such that it will substantially fit the sides of the counterbore in which it lies.

The body of the packing 3 is arranged to be mainly spaced away from a shaft 6 passing therethrough, which it is intended to seal against the passage of oil, and is preferably tapered inwardly so that only the outer marginal edge 7 is in contact with the shaft. This provides substantially a line contact between the packing and the shaft the pressure and effectiveness of which can be more readily controlled.

A metallic clamping ring 8, preferably endless, is positioned in the packing member adjacent the flanged portion thereof and is mechanically expanded or forced radially after insertion so as to clamp the flange 5 against the side wall of the shell or housing 1 and permanently secure the packing to the shell. The packing 3 is preferably formed so that the flange 5 is positioned at the outer edge or margin of the shoulder 4 thus providing a flat bottomed counterbore in the packing member in which the clamping ring 8 is seated before it is expanded. With such an arrangement the clamping ring, when expanded, clamps the packing member tightly against the shoulder 2 of the shell or housing as well as against the side wall thereof and obviates the possibility of the packing buckling adjacent the shoulder 4 and becoming inverted due to any reciprocating action of the shaft. It is this feature of the improved seal that makes practical its application to reciprocable rods such as the piston rods of shock absorbers and the like where oil is employed under pressure.

The end of the shell 1 adjacent the flanged portion of the packing is provided with a second counterbore formed to receive a flat washer 9 which serves to reduce the aperture at that end of the seal and also prevent the possibility of axial shifting of the ring 8 and the packing. The marginal edge of the seal is spun or rolled over the outer margin of the washer 9 after assembly to secure the same in place.

The counterbore at the opposite end of the seal shown in Fig. 1 is formed to receive and house the packing contracting means which comprises an axially shiftable ring 10 having a frusto-conical bearing portion 11 arranged to bear against the tapered rim 7 of the packing member. The ring 10 is urged axially, to contract the rim 7 of the packing about the shaft, by means of a plurality of springs 12 which are carried by a flat ring 13 seated in a counterbore at the end margin of the shell and secured by spinning or rolling the said margin inwardly over the ring.

In order to securely grip the flange 5 of the packing member a plurality of grooves 14 are preferably formed on the outer surface of the ring 8 and on the inner surface of the shell or housing 1 adjacent the flange 5. These grooves may be of the same form as screw threads, but are preferably cut circularly rather than helically. With such an arrangement the ridges between the grooves of the ring 8 are forced into the flange 5 of the packing, as the ring is radially forced or expanded, and the flange is forced into the grooves of the shell, thus providing a definite bite between the packing and its securing means.

In the modified form of the improved seal shown in Fig. 3 the shell or housing 1 is provided with an inwardly projecting annular flange or shoulder 15 at one end and is provided with a counterbore at its opposite end to form a second shoulder 16 intermediate the ends. The packing member 3 of this seal is of the same form as the one used in the seal shown in Fig. 1 and is positioned in the shell with its shoulder 4 abutting the end shoulder 15 of the shell. In this case the shaft embracing portion 7 of the packing extends axially beyond the end of the shell 1.

The packing member is secured to the shell by means of a grooved radially expanded ring in the same manner as has been described above and a flat washer 17 is seated in the counterbore against the shoulder 16 to prevent any possibility of axial movement of the packing and securing ring.

A flexible washer 18 arranged to embrace the shaft 6, passing through the seal, is seated in the counterbore against the washer 17 and a cup-shaped ring or member 19 having an axially extending flange 20 is positioned over the flexible washer 18 to hold it in place. The flange 20 of the cup-shaped member 19 is arranged to extend inwardly to contact and secure the washer 17 and the member 19 is held in place by the spun or rolled over margin 21 of the shell.

This form of seal is particularly adaptable for sealing the piston rod of a shock absorber or the like and a typical application of the same is shown in Fig. 4. In this arrangement the seal is pressed into the boss or bearing housing 22 on the device to be sealed and is positioned on the outer side of the bearing 23. The packing contracting ring 10 is disposed over the axially projecting portion of the packing between the seal 1 and the bearing and is actuated by a helical spring 24 disposed between the ring 10 and the bearing 23, the spring 24 being compressed between the bearing and the contracting ring.

In the manufacture of the improved seals shown in the drawing the shell or housing 1 may be made in any suitable manner and of any suitable material. However, in order to reduce the cost of manufacture it is preferable that they be made as die castings. The securing ring 8 is preferably made of a somewhat ductile metal such as brass and the contracting ring 10 and washers 9, 13, 17 and 19 may be metal stampings. The packing member 3 is preferably of a flexible material such as leather and the flexible washer 18 may be of felt or other suitable material.

In operation and use the improved seals, which are preferably made up in units of predetermined diameters, are driven, or set and clamped, in a shaft or rod housing. The shaft or rod is then passed through the seal and the device is ready for operation.

The proportions of the seal are such that the tapered portion 7 of the packing will lightly contact the shaft when the same has been passed through the seal and the contracting member, which is always under a constant pressure from the springs urging it against the packing, maintains a continuous line contact between the shaft and the packing because of its frusto-conical washer engaging portion, thus, automatically compensating for wear on either the shaft or the packing.

In the embodiments of this invention shown in the drawing the packing member is shown surrounding the shaft and supported by the structure in which the shaft is housed. However, the packing might be directly supported on and carried by the shaft in a reversal of the structure shown, and it is intended that the claim cover such an arrangement.

Although but two specific embodiments of this invention are herein shown and described it will be understood that details of the structures shown may be altered or omitted without departing from the spirit of this invention as defined by the following claim.

I claim:

An oil seal comprising a hollow annular shell surrounding a shaft and having an internal radial flange disposed intermediate its ends, a flexible annular packing member having an axially extending portion projecting over and beyond the inner edge of said flange and converging inwardly toward said shaft, the outer surface of the converging portion of said packing being tapered inwardly toward said shaft, a radial shoulder on said packing member abutting said flange, an axially extending collar on said shoulder arranged to engage the wall of said shell, an annular clamping ring disposed within said collar and expanded radially to clamp said collar to said shell, said clamping ring and the adjacent wall of said shell having annular grooves into which the surfaces of said collar are forced as the same is clamped between them, an axially shiftable ring housed within said shell and having a frusto-conical inner margin arranged to engage the tapered portion of said packing member, a flat ring secured to the end of said shell for retaining said shiftable ring, and means disposed between said flat ring and said shiftable ring arranged to urge said shiftable ring axially to contract the tapered end margin of said packing member about said shaft.

REMI J. GITS.